US008315844B2

(12) United States Patent
Thompson et al.

(10) Patent No.: US 8,315,844 B2
(45) Date of Patent: Nov. 20, 2012

(54) METHOD, COMPUTER PROGRAM PRODUCT, AND APPARATUS FOR COMPARING TRAFFIC PATTERN MODELS OF A COMPLEX COMMUNICATION SYSTEM

(75) Inventors: Stanley Thompson, Atlanta, GA (US); George Jung, Cumming, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 401 days.

(21) Appl. No.: 12/559,758

(22) Filed: Sep. 15, 2009

(65) Prior Publication Data

US 2011/0066415 A1  Mar. 17, 2011

(51) Int. Cl.
*G06F 17/50* (2006.01)
(52) U.S. Cl. ......... 703/2; 703/13; 370/395.42; 370/230; 370/235; 709/223
(58) Field of Classification Search .............. 703/2, 13; 370/230, 235, 395.42; 709/223
See application file for complete search history.

(56) References Cited

U.S. PATENT DOCUMENTS

| | | | | |
|---|---|---|---|---|
| 6,263,047 | B1 * | 7/2001 | Randle et al. | 379/31 |
| 7,453,801 | B2 * | 11/2008 | Taneja et al. | 370/230 |
| 7,822,837 | B1 * | 10/2010 | Urban et al. | 709/223 |
| 2002/0131365 | A1 * | 9/2002 | Barker et al. | 370/235 |
| 2004/0001493 | A1 * | 1/2004 | Cloonan et al. | 370/395.42 |

OTHER PUBLICATIONS

De Gooijer et al. "25 years of time series forecasting", Intl J Forecasting, 22:443-473 (2006).
Parkinson, R. "Traffic Engineering Techniques in Telecommunications", Infotel Systems Corp. (2002).
Sadasivam et al. "A Service-Based Entropic Model for Sensors Orchestration", Intl J Distributed Sensor Networks, 5:224-241 (2009).
Sadasivam et al. "A Service-Based Entropic Model for Sensors Orchestration", Intl J. Distributed Sensor Networks, 5:1-18 (2009).
Parkinson, Richard, "Traffic Engineering Techniques in Telecommunications", Infotel Systems Corp. (2002).
Thompson et al. "Issues With Calculating Conant's Decomposition Transmission Parameters for High Entropy Variables", Integrated Design and Process Technology (2008).
Thompson, et al. "Analysis of Large Scale Component Based Systems", Integraged Design and Process Technology (2006).
Mihram, G. Arthur "The Modeling Process", IEEE Trans on Sys Man, and Cyb, 2(5) (Nov. 1972).
Landauer, Rolf "information is Physical", IEEE (1992).
Conant, Roger C. "Detecting Subsystems of a Complex System", IEEE (1972).

* cited by examiner

*Primary Examiner* — Thai Phan
(74) *Attorney, Agent, or Firm* — Parks IP Law LLC; Jennifer P. Medlin, Esq.

(57) ABSTRACT

Traffic pattern models of a complex communication system are compared. A normalized transmission parameter is computed for each traffic pattern model. Model parameters are also computed for each traffic pattern model. The model parameters for each traffic pattern model represent anticipated traffic flow through the complex communication system over a predetermined time period. Data representing an actual traffic flow pattern through the complex communication system over the predetermined time period is compared to the model parameters representing anticipated traffic patterns for each model. The normalized transmission parameters for each of the traffic pattern models are also compared.

20 Claims, 9 Drawing Sheets

| TRUNK | TCBH MODEL NORMALIZED TRANSMISSION | BUSY HOUR | 24 HOUR MODEL NORMALIZED TRANSMISSION |
|---|---|---|---|
| 1 | 0.002 | 17 | 0.389 |
| 2 | 0.007 | 17 | 0.439 |
| 3 | 0.006 | 11 | 0.435 |
| 4 | 0.007 | 11 | 0.437 |
| 5 | 0.003 | 11 | 0.481 |

FIG. 7

| TRUNKS COMBINED | SAME BUSY HOUR | COMBINED BUSY HOUR AVERAGE USAGE | TCBH MODEL ESTIMATE | 24 HOUR MODEL ESTIMATE | TCBH MODEL % ERROR | 24 HOUR MODEL % ERROR | 24 HOUR MODEL % SAVINGS |
|---|---|---|---|---|---|---|---|
| 1 AND 2 | YES | 11859.2 | 11859.3 | 11859.3 | 0% | 0% | 0% |
| 1 AND 3 | YES | 9981.7 | 9981.7 | 9981.7 | 0% | 0% | 0% |
| 1 AND 4 | NO | 6345.4 | 6525.1 | 6404.7 | 2.8% | 0.9% | 1.9% |
| 1 AND 5 | NO | 4400.4 | 4488.2 | 4400.4 | 2.0% | 0% | 2.0% |
| 2 AND 3 | YES | 16380.6 | 16380.6 | 16380.6 | 0% | 0% | 0% |
| 2 AND 4 | NO | 12574.6 | 12924.0 | 12778.8 | 2.8% | 1.6% | 1.2% |
| 2 AND 5 | NO | 10799.3 | 10887.4 | 10799.3 | 0.8% | 0% | 0.8% |
| 3 AND 4 | NO | 10676.1 | 11046.4 | 10676.1 | 3.5% | 0% | 3.5% |
| 3 AND 5 | NO | 8921.8 | 9009.5 | 8921.7 | 1.0% | 0% | 1.0% |
| 4 AND 5 | YES | 5553.6 | 5552.9 | 5553.6 | 0% | 0% | 0% |

FIG. 8

| ATM HER CIRCUIT | TCBH MODEL NORMALIZED TRANSMISSION | 6 HOUR MODEL NORMALIZED TRANSMISSION | 24 HOUR MODEL NORMALIZED TRANSMISSION |
| --- | --- | --- | --- |
| 1 | 0.051 | 0.148 | 0.403 |
| 2 | 0.016 | 0.148 | 0.404 |
| 3 | 0.021 | 0.217 | 0.348 |
| 4 | 0.037 | 0.253 | 0.262 |
| 5 | 0.008 | 0.127 | 0.269 |
| AVERAGE | 0.027 | 0.179 | 0.338 |

FIG. 9

| ATM HER CIRCUIT | TCBH MODEL % ERROR | 6 HOUR MODEL % ERROR | 24 HOUR MODEL % ERROR |
| --- | --- | --- | --- |
| 1 | 11.4% | 0.91% | 0.50% |
| 2 | 21.6% | 1.5% | 0.50 % |
| 3 | 14.2% | 0.09% | 0.30 % |
| 4 | 33.2% | 1.89% | 0.40 % |
| 5 | 18.6% | 18.6% | 1.0 % |
| AVERAGE | 19.8% | 19.8% | 0.56% |

FIG. 10

METHOD, COMPUTER PROGRAM PRODUCT, AND APPARATUS FOR COMPARING TRAFFIC PATTERN MODELS OF A COMPLEX COMMUNICATION SYSTEM

BACKGROUND

Exemplary embodiments relate to modeling of communication systems.

Telecommunication systems have evolved from basic analog voice communications over copper wires to complex packet-based communications. Conventional analog voice communication networks differ greatly from digital communication networks, both in terms of architecture and usage.

As telecommunications increasingly involve a combination of voice and data, networks have become increasingly complex. Legacy networks are proving to be inadequate to meet today's demands.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to an exemplary embodiment, a method for comparing traffic pattern models of a complex communication system is provided. A normalized transmission parameter for each traffic pattern model is computed, along with model parameters for each traffic pattern model. The model parameters for each traffic pattern model represent anticipated traffic flow through the complex communication system over a predetermined time period. Data representing an actual traffic flow pattern through the complex communication system over the predetermined time period is received and compared with the model parameters representing anticipated traffic patterns for each model. The normalized transmission parameters for each of the traffic pattern models are also compared.

According to another embodiment, a computer readable medium includes instructions encoded thereon. The instructions, when executed by a processor, cause the processor to compute a normalized transmission parameter for each traffic pattern model and computer model parameters for each traffic pattern model. The model parameters for each traffic pattern model represent anticipated traffic flow through the complex communication system over a predetermined time period. The instructions further cause the processor to compare the model parameters representing anticipated traffic patterns for each model with received data representing an actual traffic flow pattern through the complex communication system over the predetermined time period and to compare the normalized transmission parameters for each of the traffic pattern models.

According to another embodiment, a system compares traffic pattern models of a complex communication system. The system includes a processor for computing a normalized transmission parameter for each traffic pattern model and computing model parameters for each traffic pattern model. The model parameters for each traffic pattern model represent anticipated traffic flow through the complex communication system over a predetermined time period. The system further includes an interface coupled to the processor for receiving data representing actual traffic flow through the complex communication system over the predetermined time period. The processor compares the model parameters representing anticipated traffic patterns for each model to the data representing the actual traffic flow pattern for the communication system and compares the normalized transmission parameters for each of the traffic pattern models.

According to another embodiment, other methods, computer program products, and/or systems according to various embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 7 illustrates a comparison of normalized transmission parameters computed for a time-consistent busy-hour model versus a twenty four model for various trunks.

FIG. 8 illustrates a comparison of a time-consistent busy-hour model versus a twenty-four hour model for various trunk combinations.

FIG. 9 illustrates a comparison of normalized transmission parameters computed for an ATM-HER circuit time-consistent busy-hour model versus a twenty four hour model for various trunks.

FIG. 10 illustrates validation results of an ATM-HER circuit time-consistent busy hour, a six hour model, and a twenty four hour model for various trunks.

DETAILED DESCRIPTION

Figure 1A:
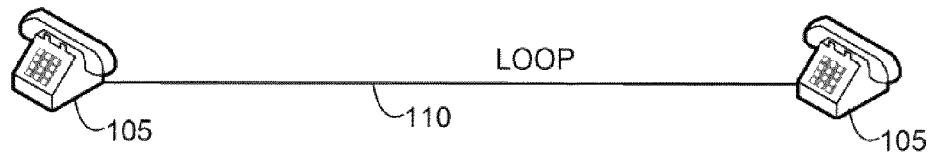
FIGS. 1A-1D illustrate exemplary voice communication environments.

Exemplary embodiments will be described more fully hereinafter with reference to the accompanying figures, in which embodiments are shown. This invention may, however, be embodied in many alternate forms and should not be construed as limited to the embodiments set forth herein.

Exemplary embodiments are described below with reference to block diagrams and/or flowchart illustrations of methods, apparatus (systems and/or devices) and/or computer program products. It should be understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, digital signal processor and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a processor of the computer and/or other programmable data processing apparatus to function in a particular manner, such that the instructions stored in the computer-readable memory produce an article of manufacture including instructions which implement the function/act as specified in the block diagrams and/or flowchart block or blocks.

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.) that runs on a processor such as a digital signal processor, collectively referred to as "circuitry" or "a circuit". Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate or transport the program for use by or in connection with the instruction execution system, apparatus, or device.

The computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Telecommunications and data networks are large-scale complex engineering systems. The collection, storage, and processing of traffic usage data in such networks is very costly. Existing systems use traffic models developed prior to the current generation of mechanized systems. For example, voice trunking and switch polling use a time-consistent busy hour model that was developed when calculations were performed manually. This single hour model does not address potential savings associated with combining traffic switch non-consistent busy-hours.

The successful management of these types of networks can be simplified by decomposing these complex engineering systems into smaller subsystems that can be economically modeled. According to an exemplary embodiment, information theory can be applied to real-life complex communications systems to identify their relevant sub-systems so that timely, reliable, and economical architecture can be engineered through the use of models.

The connections among specific elements of a voice or data communication network have typical patterns of usage that contain information. The information content in the usage pattern can be used as a signature to identify sub-systems of the overall network Knowledge of these sub-systems can be used to plan appropriate architectures and economic capacity additions to ensure adequate service levels. Information theoretical analysis, such as the calculation of transmission parameters among connections, is one approach that can be used to decompose the complex communication networks.

According to exemplary embodiments, improved match of capital expenditure timing and sizing to service requirements may be provided. Potential reduction in trunk and switch capacity requirement can be identified and implement without a reduction in service quality. This capacity can also be applied to data system capacity requirements that have less predictability than voice traffic.

Figure 1B:
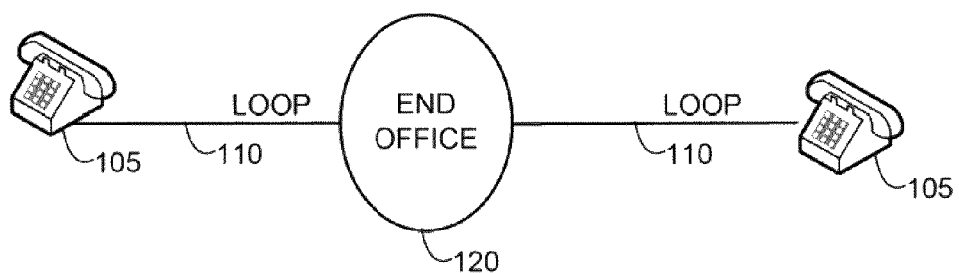
Figure 1C:
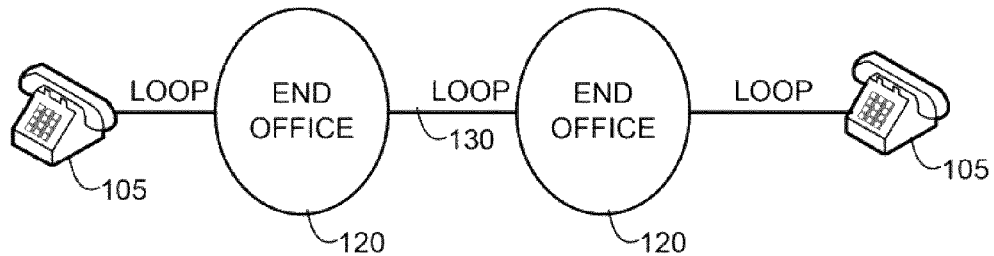
Figure 1D:
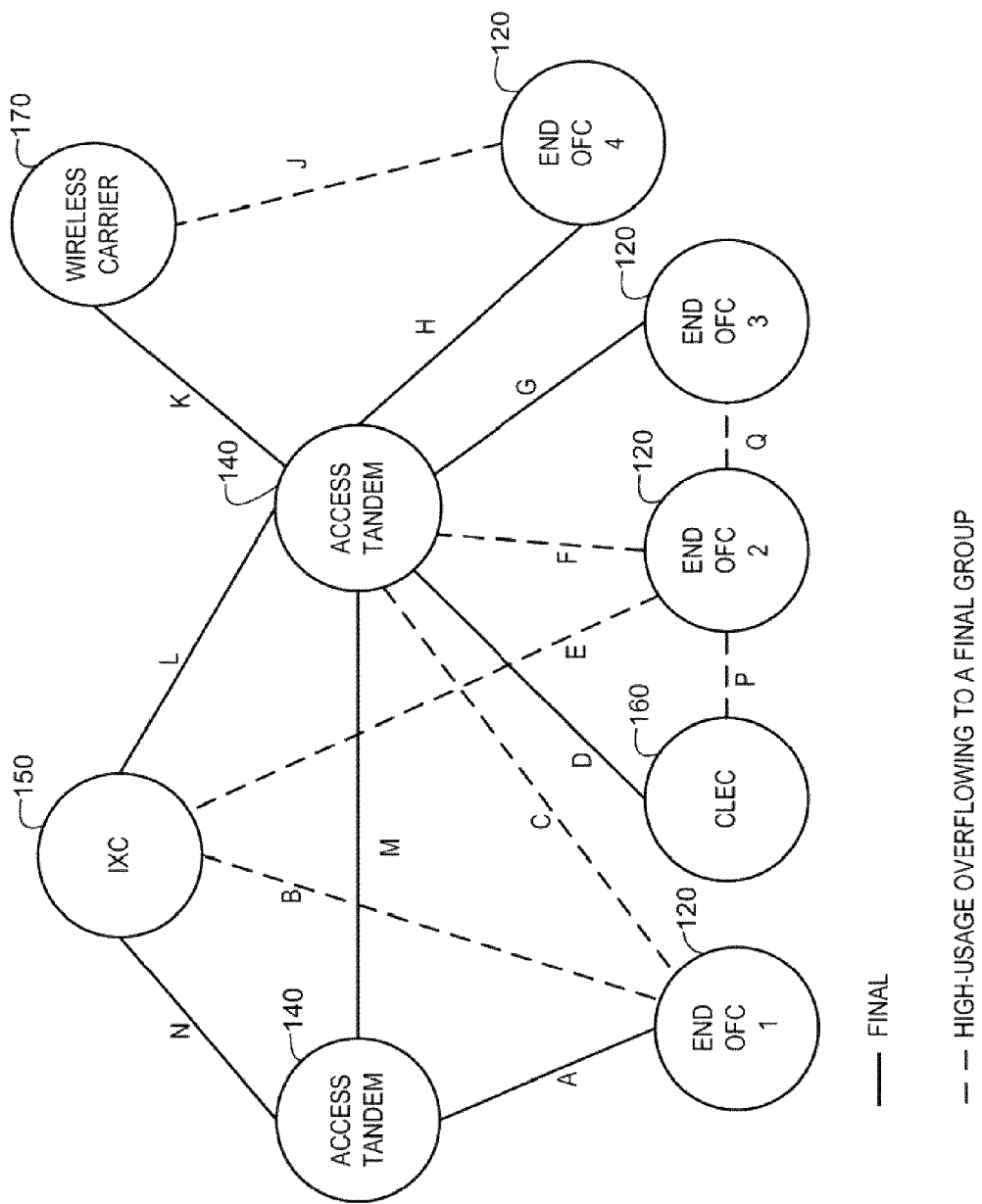

FIGS. 1A-1D illustrate exemplary voice communication environments. In FIG. 1A, voice communication between end user devices, such as telephones 105, occurs, e.g., over a pair of copper wires or loop 110 connecting the devices 105. There may be multiple loops 110 connected via one or more end office switches 120 as shown in FIG. 1B. End office switches 120 may, in turn be connected via a trunk 130 as shown in FIG. 1C. FIG. 1D illustrates an exemplary trunking arrangement in which end office switches 120 can be connected to each other via multiple connections including high-usage direct trunks (represented by dashed lines in FIG. 1D and also referenced as B, C, E, F, J, P, and Q) and/or can be connected via final trunks (represented by solid lines and also referenced as A, D, G, H, K, N, M, and L) connected to tandem offices or interconnecting carrier offices (including an Interexchange Carrier (IXC) 150, a Competitive Local Exchange Carrier (CLEC) 160 and a Wireless Carrier 170). The trunking arrangement in FIG. 1D is a simplified version of a voice communication system and is shown as an example to illustrate that even a simple voice communication environments may involve a complex arrangement of circuitry.

Figure 2:
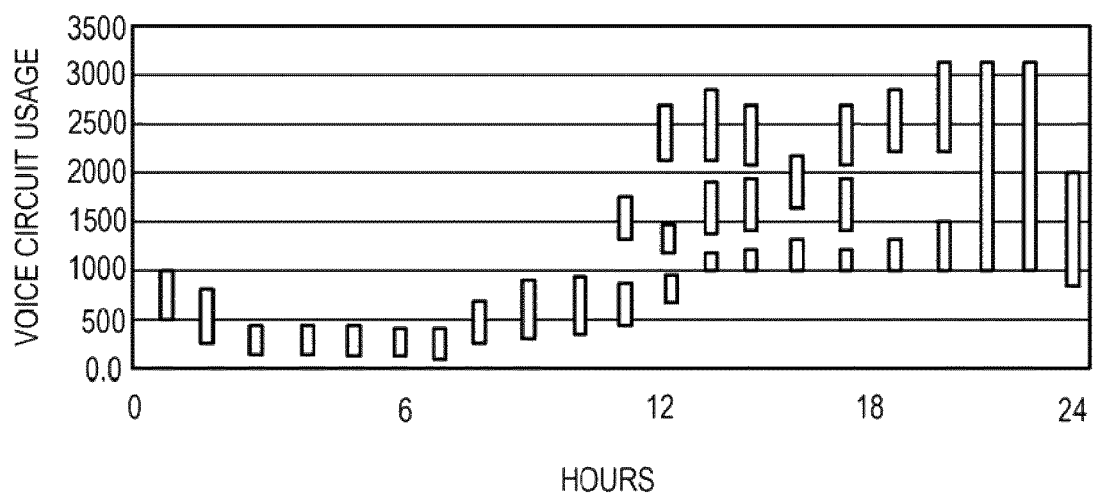
FIG. 2 illustrates an example of voice circuit usage during a twenty-four hour time period.

FIG. 2 illustrates an exemplary pattern of voice circuit usage over a twenty four hour period. As can be seen by the voice usage pattern example shown in FIG. 2, voice circuit usage is low in the early morning and peaks in the late morning. Other peaks occur in the early and late evenings. Usage may be lower on the weekends.

Data communication networks, including VoIP networks, may be simple data networks including two nodes connected by a link. This may include a client and a server connected by a data path. However, data communication networks are typically more large-scale networks having many clients and many servers interconnected via multiple paths via numerous switches, routers, gateways, and other devices. Typical capacity constraints include the bandwidth of the links and interfaces, and the processing, memory, and storage capacity at the end and intermediate nodes.

Figure 3:
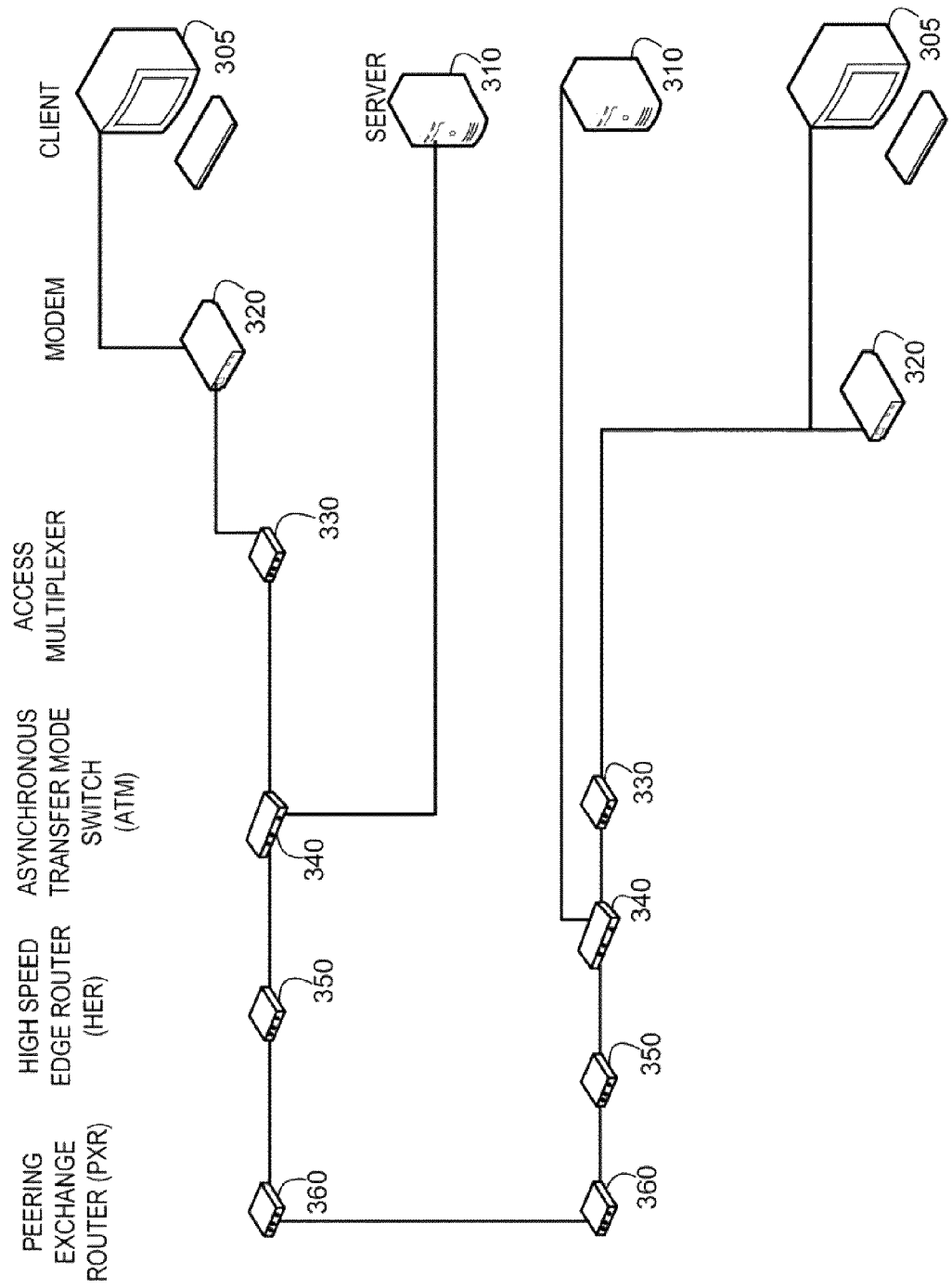
FIG. 3 illustrates an exemplary data communication environment.

FIG. 3 shows an example of a data communication network. The communication network includes servers 310 and clients 305 connected to an access portion, which may include modems 320, access multiplexers 330 and Asynchronous Transmission Mode Switches (ATMs) 340. Traffic is aggregated at the edge of the communication network, while routing occurs in the core of the communication network via devices such as High Speed Edge Routers (HERs) 350 and Peering Exchange Routers (PXRs) 360. It should be appreciated that the data communication network shown in FIG. 3 is shown by way of example, as data communication networks may involve many more devices and complex configurations.

Figure 4A:
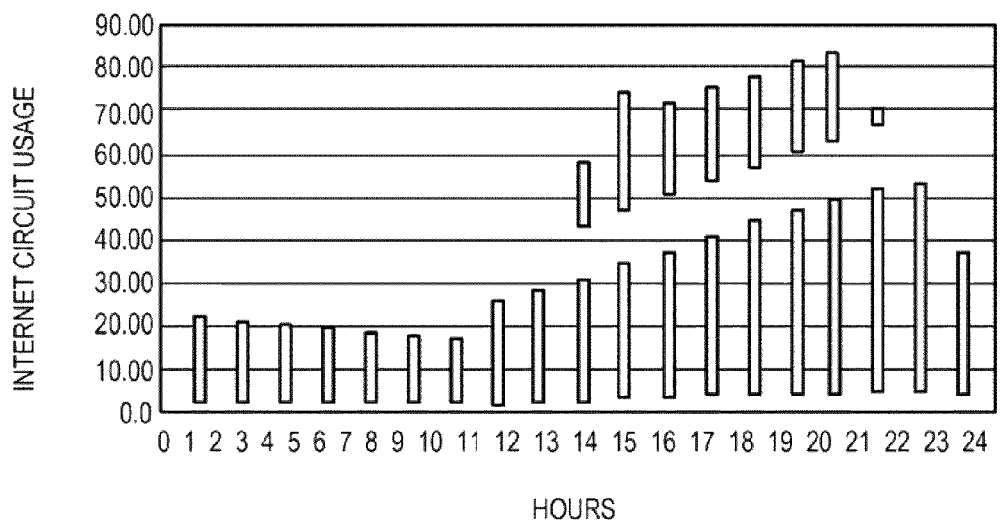
FIGS. 4A and 4B illustrate examples of data circuit usage during a twenty-four hour time period.
Figure 4B:
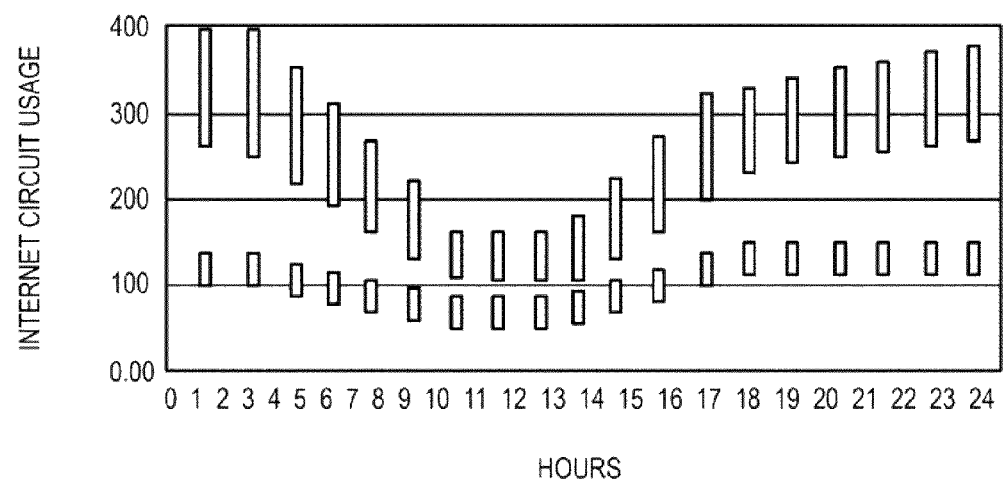

Data usage patterns may be similar to voice usage patterns, as shown in FIG. 4A, or may be quite different, as shown in FIG. 4B.

As voice communications and data communications increase, so does the complexity of the systems supporting those communications. Also, the variety in communications involving voice and data require traffic models that need to be adaptable to provide capacity for such communication. According to an exemplary embodiment, models of traffic patterns may be compared to determine which model best represents actual traffic patterns.

There are various types of traffic models. For example, in a time consistent busy hour (TCBH) model, hourly traffic is collected over a period of two months and the average busiest hour during a twenty-four hour time period is selected as the busiest hour. Other models, such as a 24 hour model, may track traffic over a 24 hour time period. According to this model, 24 individual hours are measured, and the first or most busy hour is determined, the second busiest hour is determined, and so on. Other models may track traffic over multiple hours, e.g., over 6 hour time periods. According to exemplary embodiments, the comparison of traffic models may be used to compare the results of any traffic model, regardless of how the model measures traffic in time increments. These various models are described in more detail below.

For each model, the busiest hour is computed, and that busiest hour is compared to the actual traffic data representing the busiest hours. This computation may involve computation of a normalized transmission parameter, such as the Conant's transmission parameter, and computing model parameters.

According to exemplary embodiments, in a TCBH traffic model, traffic is modeled by collecting hourly traffic data for all available days during the busy season. Traffic on weekends and holiday hours are excluded from the collected data. For each of the twenty-four hours in a day, the busy season usage is added, and the result is divided by the number of hours included in computing the sum to obtain an average usage. The busy hour is determined as the hour with the greatest average usage. The busy hour is the one with the greatest average value over the number of days included in the modeling.

In a Twenty Four Hour model, traffic is modeled by collecting hourly traffic data for all available days during the busy season. Weekend and holiday hours are excluded from the data. For each of the twenty-four hours in a day, busy season usage is added and divided by the number of hours included in the sum to obtain the average. The model is defined by the twenty-four hourly averages. The hours are ranked according to the most busy hour, second most busy hour, etc., based on the greatest average hour.

For multiple hour models, e.g., a models having six-hour increments, data is collected for over various time intervals. For example, a model "B" may be defined as determining the six hours beginning at midnight as busy and the other eighteen hours as not busy. Model "C" may be defined as determining the six hours beginning at seven AM as busy and the other eighteen hours as not busy. Model "D" may be defined as determining the six hours beginning at noon as busy and the other eighteen hours as not busy. Model "E" may be defined as determining the six hours beginning at six PM as busy and the other eighteen hours as not busy.

Although not described in detail, sub-hour models may also be used in which data is collected over portions of hours over various time intervals. Another model that may be used is the Bouncing Busy Hour Model. In this model, the "bouncing busy hour" is the hour in each day that has the highest traffic load. This hour may be different from day-to-day. The individual traffic loads are averaged over a number of days. The Bouncing Busy Hour model is contrasted with Time Consistent Busy Hour model, in which the "busy" hour is the same over a number of days and is determined as the hour in each day during which, over a number of days, the highest average traffic occurs.

According to an exemplary embodiment, models of traffic patterns may be compared by comparing the normalized transmission parameters for each model and comparing the model parameters representing anticipated traffic flow with data representing actual traffic flow.

For computing a transmission parameter, consider a complex system that has K primary variables, each of which is observed once every standard time increment N, giving a total of K·N observations. With each of the primary variables is associated a derived variable $X_j, 1 \leq j \leq K$ that can be grouped into sets. If the K primary variables are not integer metrics, then derived integer variables, $X_j, 1 \leq j \leq K$, may be chosen to represent the subsystem categories. The variables are grouped into sets of time series observations. The number of occurrences, n, of each possible value in each set is counted and used to calculate the entropy of that according to the following formula:

$$H(X_j) = \log_2 N - \frac{1}{N} \sum_{i=1}^{M_j} n_i \log_2 n_i$$

where j is the $j^{th}$ variable, $H(X_j)$ represents the entropy of the variable, $X_j$. N is the total number of observations, $M_j$ is the upper limit of the range of values of $X_j$, i=index value, and $n_i$=number of observations of each index value.

Vectors representing pair-wise combinations of each set of a variable's time series observations with the second variable offset by one time step are generated. The number of occurrences of each possible combination of values in each vector is counted for each vector and used to calculate the joint entropy $H(X_i, X_j')$, where $X_j'$ represents the set of observations offset by one time increment. The transmission parameter may then be calculated as:

$$T(X_i; X_j') = H(X_i) + H(X_j') - H(X_i, X_j').$$

The normalized transmission $t_{ij}$ can be obtained by dividing $T(X_i; X_j')$ values by $H(X_j')$ as given below:

$$t_{ij} = \frac{T(X_i; X_j')}{H(X_j')}.$$

A normalized transmission parameter computed in this manner for each model may be used to compare models. The normalized transmission parameter is a measure of the match between the model and the data being modeled. The possible values of the parameter range from 0 to 1 with 1 representing a perfect match and lower values representing lower quality of model. If there is a good match of information, this means the model is good. If there is not a good match, the model is not good.

As noted above, model parameters may also be used to compare traffic pattern models with actual traffic patterns This involves determining the information content of the model and determining the information content of the data.

According to an exemplary embodiment, a model's entropy is computed as the parameter to compare with data representing the actual traffic flow. The calculation of a model's entropy $H_{single\ hour}$ is described below. Using a single hour TCBH model, there are two possible states, busy or not busy. The busy hour is considered busy and the other twenty three hours are considered not busy.

$$H_{single\ hour} = -\frac{1}{24}\log_2\left(\frac{1}{24}\right) - \frac{23}{24}\log_2\left(\frac{23}{24}\right) = 0.19 + 0.06 = 0.25$$

For the twenty-four hour model, the entropy $H_{24\ hour}$ for the twenty-four different states may be determined as:

$$H_{24\ hour} = 24\left(-\frac{1}{24}\log_2\left(\frac{1}{24}\right)\right) = 4.58$$

Similarly, the information content of data may be determined by calculating its entropy. As an example, if there are twenty weekdays in a study period, then there are a total of 480 hours, twenty hours (one each day) that would be considered busy and the remaining 460 not busy.

$$H_{data-single\ hour} = -\frac{20}{480}\log_2\left(\frac{20}{480}\right) - \frac{460}{480}\log_2\left(\frac{460}{480}\right) = 0.19 + 0.06 = 0.25$$

For comparing the data to the twenty-four hour model, the data can be grouped into twenty-four states using percentiles producing the entropy as shown in the equation below.

$$H_{data-24\ hour} = 24 - \left(\frac{20}{480}\log_2\left(\frac{20}{480}\right)\right) = 4.58$$

The entropy of the combinations of the models with the data is data dependent. For the single hour model, each hour can be in one of four possible states, model busy and data busy, model not busy and data not busy, model not busy and data busy, and model busy and data not busy. The number of occurrences of each state are summed and used in the entropy computation as shown in the following equation.

$$H_{model,data} = -\frac{n_{busy,\ busy}}{480}\log_2\left(\frac{n_{busy,\ busy}}{480}\right) -$$
$$\frac{n_{notbusy,\ notbusy}}{480}\log_2\left(\frac{n_{notbusy,\ notbusy}}{480}\right) -$$
$$\frac{n_{busy,\ notbusy}}{480}\log_2\left(\frac{n_{busy,\ notbusy}}{480}\right) -$$
$$\frac{n_{notbusy,\ busy}}{480}\log_2\left(\frac{n_{notbusy,\ busy}}{480}\right)$$

If the data matches the model perfectly, and every data busy hour coincides with the model busy hour, then the last two terms would equal zero, and the entropy of the combination would be equal to the entropy of the model. In the other extreme, if the data busy hour never coincides with the model busy hour, the first term would be zero, and the result would equal about twice the entropy of the model.

The twenty-four hour model has five hundred seventy possible states (twenty-four squared). Fortunately, most of these states do not occur in practical situations, so it is usually sufficient to count and calculate the entropy using the state that actually do occur.

Figure 5:
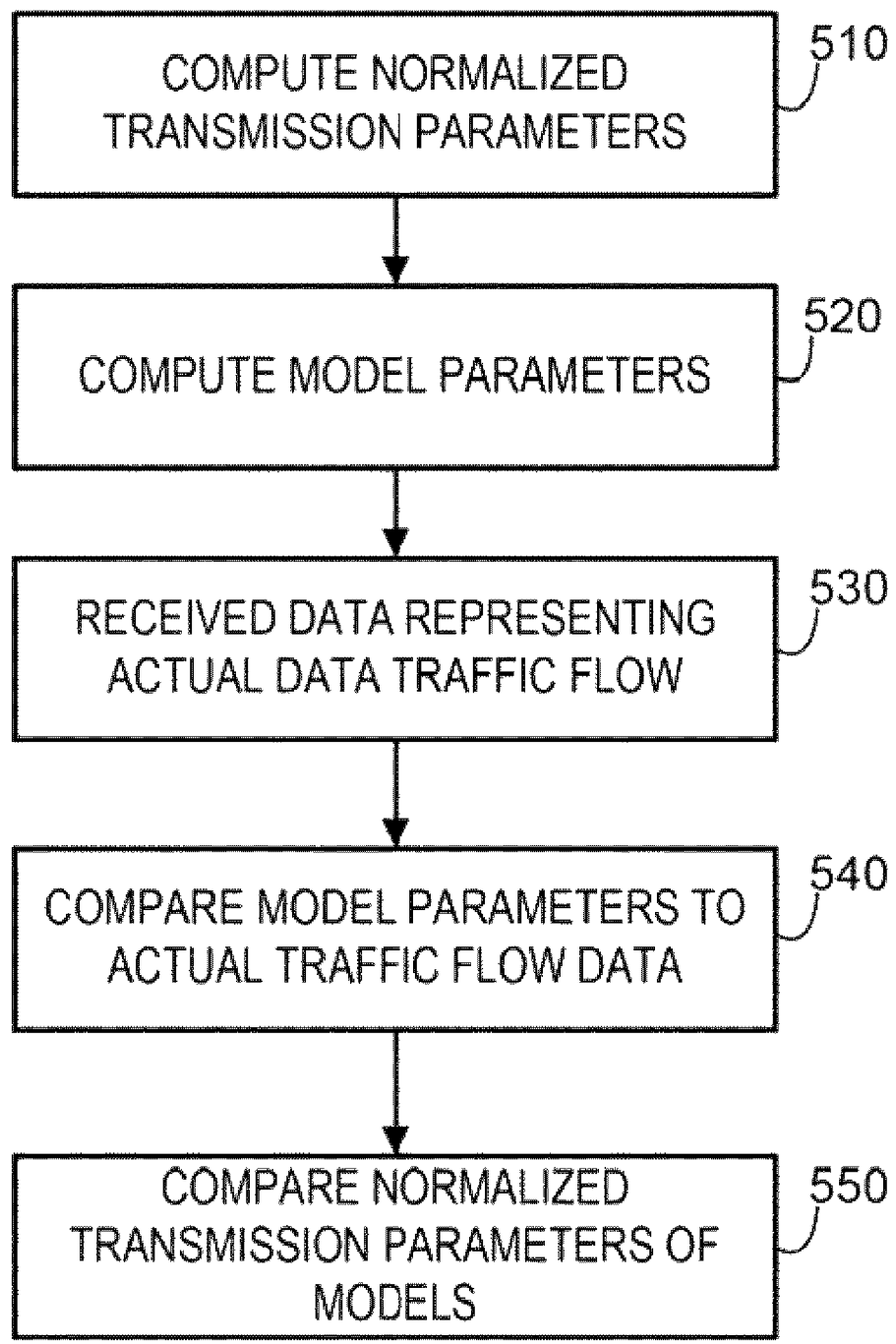
FIG. 5 is a flowchart illustrating a method for comparing traffic models according to an exemplary embodiment.

FIG. 5 illustrates a method for comparing traffic pattern models of a complex communication system. At step 510, normalized transmission parameters are computed via, e.g., a processor, for the traffic pattern models based on variables of the complex communication system observable over standard time increments. At step 520, model parameters for each traffic pattern model are computed via, e.g., a processor. The model parameters for each traffic pattern model represent anticipated traffic flow through the complex communication system over a predetermined time period. Data representing an actual traffic flow pattern through the complex communication system over the predetermined time period is received over a data link at step 530. The model parameters representing anticipated traffic patterns for each model are compared to data representing the actual traffic flow pattern for the communication system at step 540. At step 550, normalized transmission parameters for each model are compared.

In addition to the steps illustrated in FIG. 5, the traffic model may be validated by comparison to actual data traffic flow to ensure that the models are acceptable representations of traffic flow. To validate a traffic pattern model, sets of actual traffic flow data with the same time period measurements as the traffic pattern model are selected. Any non-overlapping data points are eliminated. The traffic pattern models and their associated transmission parameters are computed, and the data sets are combined on an hour by hour basis to form a new data set. Models are computed for the new data set, and the models from the original data sets are combined. The combination of the original models are compared to the model of the new data set. The smaller the deviation between the combination of models and the model of the combined data, the better the model. Validation may occur before the traffic pattern models are compared as described above, to ensure that the most accurate traffic pattern models are used in the comparison.

It should be appreciated that one or more of the steps described above may be performed by a processor, such as that described below and illustrated in FIG. 6. Further, the order of steps is shown by way of example. The order is not restricted to the order described above.

Figure 6:
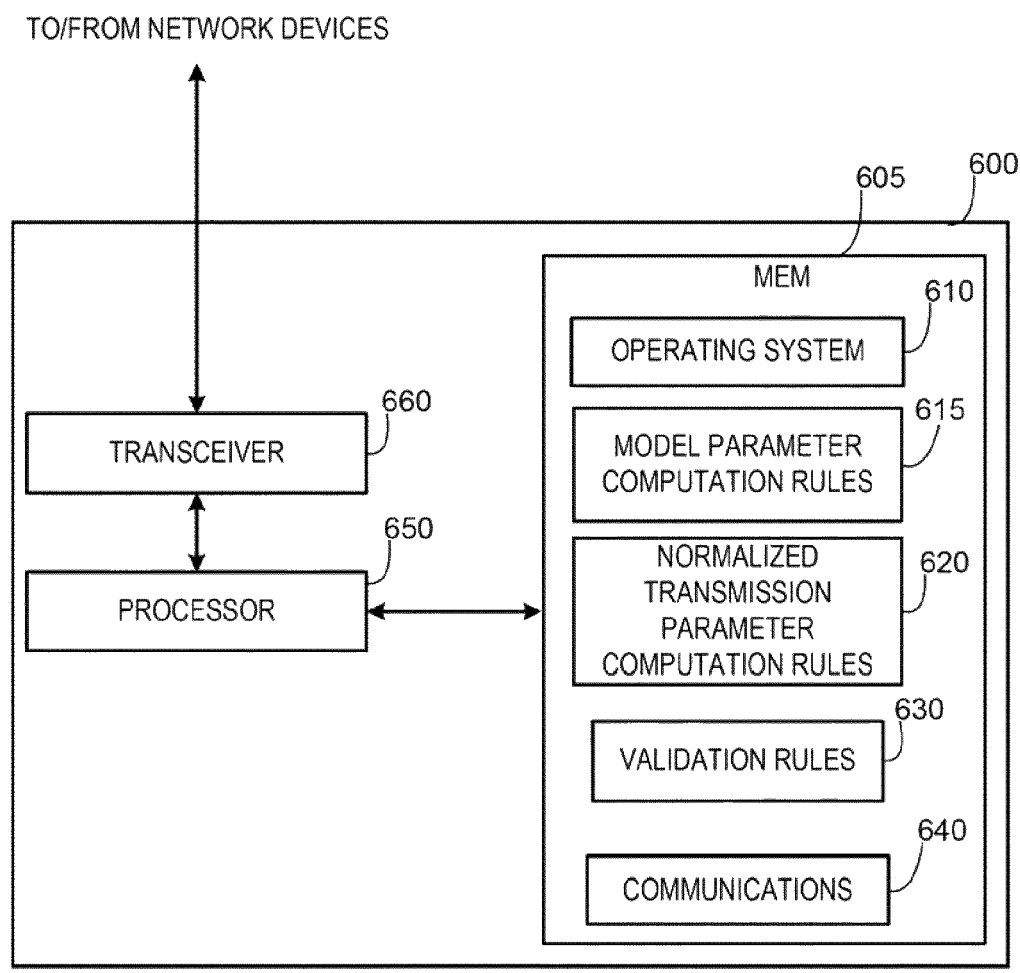
FIG. 6 illustrates a system for comparing traffic models according to an exemplary embodiment.

FIG. 6 illustrates an exemplary system for comparing traffic pattern models. Referring now to FIG. 6, the system 600 includes a processor 650, a transceiver 660, and a memory 605. The processor 650 communicates with the memory 605 via an address/data bus. The processor 650 may be, for example, a commercially available or custom microprocessor. The memory 605 is representative of the one or more memory devices containing the software and data used to facilitate application of the rules for computing transmission parameters, model parameters, and performing validation in accordance with some embodiments. The memory 605 may include, but is not limited to, the following types of devices: cache, ROM, PROM, EPROM, EEPROM, flash, SRAM, and DRAM. The transceiver 660 includes a transmitter circuit and a receiver circuit, which are used to establish and maintain communication with other devices in a communication network and to receive data indicating traffic flow through a communication system.

As shown in FIG. 6, the memory 605 may contain multiple categories of software and/or data modules including, e.g., an operating system 610, a model parameter computation rules module 615, a normalized transmission parameter rules module 620, a validation rules module 630, and a communication module 640. The operating system 610 generally controls the operation of the modules 615, 620, and 630. In particular, the operating system 610 may manage the software and/or hardware resources of the modules 615, 620, and 630 and may coordinate execution of programs by the processor 650. The communication module 640 may be configured to manage the communication protocols, including both wireless and wireline protocols, that may be used by the transceiver 660 to communicate with other devices in a communication environment, such as those shown in FIGS. 1A-1D and FIG. 3, as well as other devices. For example, although not illustrated in the interest of simplifying the drawings, those skilled in the art will appreciate that voice switching systems contain registers where traffic data is stored until it is transmitted to a data management system for analysis. Further, those skilled in the art will appreciate that network elements in data systems store usage in a similar manner until it is transmitted via Simple Network Management Protocol (SNMP) to data management systems for analysis. The communication protocols may include, but are not limited to TCP/IP, H.323, etc. The communication module 660 may control conversion of signals received in one type of communication protocol into an appropriate format/protocol for transmission to other devices.

Although not shown, the memory 605 may also include an actual data parameter computation module for computing data representing actual traffic flow for comparison with the computed model parameters. Alternatively, the data representing actual traffic flow may be computed before it is received via the transceiver 660.

Although FIG. 6 illustrates an exemplary system for comparing traffic pattern models, in accordance with some embodiments, it will be understood that the present invention is not limited to such a configuration but is intended to encompass any configuration capable of carrying out operations described herein.

Results are reported below for a Message Trunk Time-consistent Busy-Hour Model versus a Twenty-Four Hour Model, an ATM-HER Circuit Time-Consistent Busy-Hour Model versus a Twenty-four Hour Model, a Peering Exchange Router—Bilateral Peering Router Circuit Time-Consistent Busy-hour Model versus a Twenty-Four Hour Model, and an ATM-HER Circuit Six Hour Busy Period Model versus a TCBH model and a Twenty-Four Hour Models.

FIG. 7 illustrates a comparison of normalized transmission parameters computed for a time-consistent busy-hour model versus a twenty four model for various trunks. In FIG. 7, results are presented for calculating the normalized transmission parameters and models for the time-consistent busy hour and for twenty-four hours for usage on five different telephone message trunks. The normalized transmission ranges from 0.002 to 0.007. for the time-consistent busy hour model and from 0.381 to 0.439 for the twenty-four hour model. The time-consistent busy hour for three of the five trunks is the hour beginning at 17:00 or 5:00 PM. The other two trunks have busy hours beginning at 11:00 AM.

The data from the five trunks computed as described above was combined on an hour by hour basis for each of the ten possible trunk combinations. For the ten combinations included trunks with the same busy hour. In those cases where there was no perceptible different in the accuracy of the two models in predeitn the combinated ruby hour usages. For the six combinations of trunks with different busy hours, the twenty-four hour model was more accurate than the time-consistent busy hour model by 0.8% to 3.5%. This is evident from the results shown in FIG. 8 which illustrate a comparison of a time-consistent busy-hour model versus a twenty-four hour model for various trunk combinations.

FIG. 9 illustrates a comparison of normalized transmission parameters computed for an ATM-HER circuit time-consistent busy-hour model versus a twenty four hour model for various trunks. As can be seen from the results in FIG. 9, the normalized transmission is the greatest for the twenty-four hour model and the least for the time-consistent busy hour model. Error for each model was defined as the difference between the busy hour or busy period usage of the combination circuits and the busy hour or busy period of the combination of the model usage in the busy hour or busy period. The Circuit 1 error was determined by adding the absolute value of the error of each combination of circuits that included Circuit 1. The error results for the other four circuits were calculated in a similar manner.

FIG. 10 illustrates validation results of an ATM-HER circuit time-consistent busy hour, a six hour model, and a twenty four hour model for various trunks. The results illustrated in FIG. 10 show that the twenty-four model is the most accurate and the time-consistent busy hour model is the least accurate.

Computer program code for carrying out operations of devices, terminals, and/or systems discussed above may be written in a high level programming language, such as Java, C, and/or C++, for development convenience. In addition, computer program code for carrying out operations of embodiments may also be written in other programming languages, such as, but not limited to, interpreted languages. Some modules or routines may be written in assembly language or even micro code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to message flow, flowchart and/or block diagram illustrations of methods, devices, and/or computer program products. These message flow, flowchart and/or block diagrams further illustrate exemplary operations for performing file retention in accordance with various embodiments. It will be understood that each message/block of the message flow, flowchart and/or block diagram illustrations, and combinations of messages/blocks in the message flow, flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow, flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart and/or block diagram block or blocks.

Although the description above relates to voice and data traffic in a communication system, it should be appreciated that it may also be applicable to other types of traffic in other types of networks, e.g., vehicle traffic in a transportation network, etc.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for comparing traffic pattern models of a complex communication system, comprising
   computing, via a processor, a normalized transmission parameter for each traffic pattern model;
   computing, via the processor, model parameters for each traffic pattern model, wherein the model parameters for each traffic pattern model represent anticipated traffic flow through the complex communication system over a predetermined time period;
   receiving data representing an actual traffic flow pattern through the complex communication system over the predetermined time period;
   comparing, via the processor, the model parameters representing anticipated traffic patterns for each model to the data representing the actual traffic flow pattern for the communication system; and
   comparing the normalized transmission parameters for each of the traffic pattern models.

2. The method of claim 1, wherein the smaller the deviation between the model parameters and the actual traffic flow pattern, the more accurate the traffic pattern model.

3. The method of claim 1, wherein the greater the normalized transmission parameter for the traffic pattern model, the more accurate the traffic pattern model.

4. The method of claim 1, further comprising validating each traffic pattern model.

5. The method of claim 1, wherein the models include a twenty four hour time model defined by twenty-four hourly averages of data collected over multiple days, ranked in order from a busiest traffic flow hour to a least busiest traffic flow hour.

6. The method of claim 1, wherein the models include multiple hour models, each of which are defined during predetermined time intervals over a twenty four hour time period, and wherein each of the multiple hour models are ranked in terms of traffic flow.

7. The method of claim 1, wherein the models include multiple sub-hour models.

8. A non-transitory computer readable medium including instructions encoded thereon, wherein the instructions, when executed by a processor, cause the processor to
   compute a normalized transmission parameter for each traffic pattern model;
   compute model parameters for each traffic pattern model, wherein the model parameters for each traffic pattern model represent anticipated traffic flow through the complex communication system over a predetermined time period;
   compare the model parameters representing anticipated traffic patterns for each model to received data representing an actual traffic flow pattern through the complex communication system over the predetermined time period; and
   compare the normalized transmission parameters for each of the traffic pattern models.

9. The non-transitory computer readable medium of claim 8, wherein the smaller the deviation between the model parameters and the actual traffic flow pattern, the more accurate the traffic pattern model.

10. The non-transitory computer readable medium of claim 8, wherein the greater the normalized transmission parameter for the traffic pattern model, the more accurate the traffic pattern mode.

11. The non-transitory computer readable medium of claim 8, further comprising instructions for causing the processor to validate each traffic pattern model.

12. The non-transitory computer readable medium of claim 8, wherein the models include a twenty four hour time model defined by twenty-four hourly averages of data collected over multiple days, ranked in order from a busiest traffic flow hour to a least busiest traffic flow hour.

13. The non-transitory computer readable medium of claim 8, wherein the models include multiple hour models, each of which are defined during predetermined time intervals over a twenty four hour time period, and wherein each of the multiple hour models are ranked in terms of traffic flow.

14. The non-transitory computer readable medium of claim 8, wherein the models include multiple sub-hour models.

15. A system for comparing traffic pattern models of a complex communication systems, comprising:
   a processor for computing a normalized transmission parameter for each traffic pattern model, computing model parameters for each traffic pattern model, wherein the model parameters for each traffic pattern model represent anticipated traffic flow through the complex communications system over a predetermined time period;
   an interface coupled to the processor for receiving data representing actual traffic flow through the complex communication systems over the predetermined time period, wherein the processor compares the model parameters representing anticipated traffic patterns for each model to the data representing the actual traffic flow pattern for the communication system and compares the normalized transmission parameters for each of the traffic pattern models.

16. The system of claim 15, wherein the smaller the deviation between the model parameters and the actual traffic flow pattern, the more accurate the traffic pattern model.

17. The system of claim 15, wherein the greater the normalized transmission parameter for the traffic pattern model, the more accurate the traffic pattern mode.

18. The system of claim 15, wherein the processor validates each traffic pattern model.

19. The system of claim 15, wherein the models include a twenty four hour time model defined by twenty-four hourly averaged of data collected over multiple days, ranked in order from a busiest traffic flow hour to a least busiest traffic flow hour.

20. The system of claim 15, wherein the models include at least one of sub-hour models and multiple hour models, each of which are defined during predetermined time intervals over a twenty four hour time period, and wherein each of the sub-hour models and multiple hour models are ranked in terms of traffic flow.

* * * * *